(12) United States Patent
Chen et al.

(10) Patent No.: US 8,854,560 B2
(45) Date of Patent: Oct. 7, 2014

(54) AUTO-STEREOSCOPIC DISPLAY DEVICE, LIQUID CRYSTAL LENS, AND DRIVING METHOD THEREOF

(71) Applicant: Shenzhen China Star Optoelectronics Technology Co., Ltd., Guangdong (CN)

(72) Inventors: Chih-Wen Chen, Shenzhen (CN); Chia-chiang Hsiao, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 128 days.

(21) Appl. No.: 13/701,067

(22) PCT Filed: Nov. 15, 2012

(86) PCT No.: PCT/CN2012/084647
§ 371 (c)(1),
(2), (4) Date: Nov. 30, 2012

(87) PCT Pub. No.: WO2014/071643
PCT Pub. Date: May 15, 2014

(65) Prior Publication Data
US 2014/0125892 A1      May 8, 2014

(30) Foreign Application Priority Data

Nov. 6, 2012  (CN) .......................... 2012 1 0438500

(51) Int. Cl.
*G02F 1/1335* (2006.01)
*G02F 1/1343* (2006.01)
*G02F 1/1345* (2006.01)
*G02B 27/22* (2006.01)

(52) U.S. Cl.
CPC ..................................... *G02B 27/22* (2013.01)

USPC ............. 349/15; 349/139; 349/146; 349/151

(58) Field of Classification Search
CPC ............... G02B 27/22; G02B 27/2214; G02B 27/2221; G02B 27/26; H04N 13/0404; H04N 13/0409; G02F 1/136286; G02F 1/133707; G02F 1/134336; G02F 1/134363; G02F 1/1345; G02F 1/1393; G02F 1/134309; G02F 1/13452; G02F 1/13454; G02F 1/1339; G02F 2001/133388
USPC .................................... 349/15, 139, 146, 151
See application file for complete search history.

(56) References Cited

U.S. PATENT DOCUMENTS

| | | | | |
|---|---|---|---|---|
| 8,059,216 B2 * | 11/2011 | Hiddink et al. | ................. | 349/15 |
| 8,102,487 B2 * | 1/2012 | Kitagawa et al. | ................ | 349/74 |
| 8,436,953 B2 * | 5/2013 | Sakamoto et al. | .............. | 349/15 |

* cited by examiner

*Primary Examiner* — Mike Qi
(74) *Attorney, Agent, or Firm* — Andrew C. Cheng (57) ABSTRACT

An auto-stereoscopic display device is proposed. The auto-stereoscopic display device includes a display panel and a liquid crystal lens. The liquid crystal lens includes a first electrode layer and a second electrode layer. The first electrode layer includes a plurality of first electrode stripes arranged in parallel along pixel units and extending in a first or second direction. The second electrode layer includes a plurality of second electrode stripes extending slantingly relative to the plurality of first electrode stripes and being arranged in parallel. A liquid crystal lens and a driving method thereof are also proposed. Based on the present invention, a first lenticular lens unit is generated and arranged along the plurality of second electrode stripes for the 3D display mode, and a second lenticular lens unit is generated and arranged along the plurality of first electrode stripes for the 2D display mode. The invention can fulfill the 3D-mode requirement and enhance brightness and luminance in the 2D mode.

10 Claims, 5 Drawing Sheets

AUTO-STEREOSCOPIC DISPLAY DEVICE, LIQUID CRYSTAL LENS, AND DRIVING METHOD THEREOF

BACKGROUND OF THE INVENTION

1. Field of the Invention

The present invention relates to liquid crystal display technology, and more particularly, to a auto-stereoscopic display device, a liquid crystal lens, and a driving method thereof.

2. Description of the Prior Art

With the maturity in LCD technology, the auto-stereoscopic display technologies are also vigorously developed. Nowadays, there are two types of auto-stereoscopic display technologies in general, stereoscopic display technology and auto-stereoscopic display technology. A user of a stereoscopic display has to wear special type glasses to see the three-dimensional images. Not only does the user spend money on the special type glasses, but also the user does not feel comfortable when wearing them. The requirement of wearing such special type glasses impedes the widespread utilization of auto-stereoscopic displays. As for a user of an auto-stereoscopic display, he/she can see three-dimension images without the assistance of any extra devices so as to get rid of the requirement of wearing the special type glasses. Hence, auto-stereoscopic displays enjoy more popularity than auto-stereoscopic displays among the users and the sellers.

A commonly seen auto-stereoscopic display utilizes slanted lenticular lenses to realize three-dimensional display. Since the lenticular lenses will not block light from the backlight, the brightness uniformity is improved. A better display effect is thus achieved.

Figure 1:
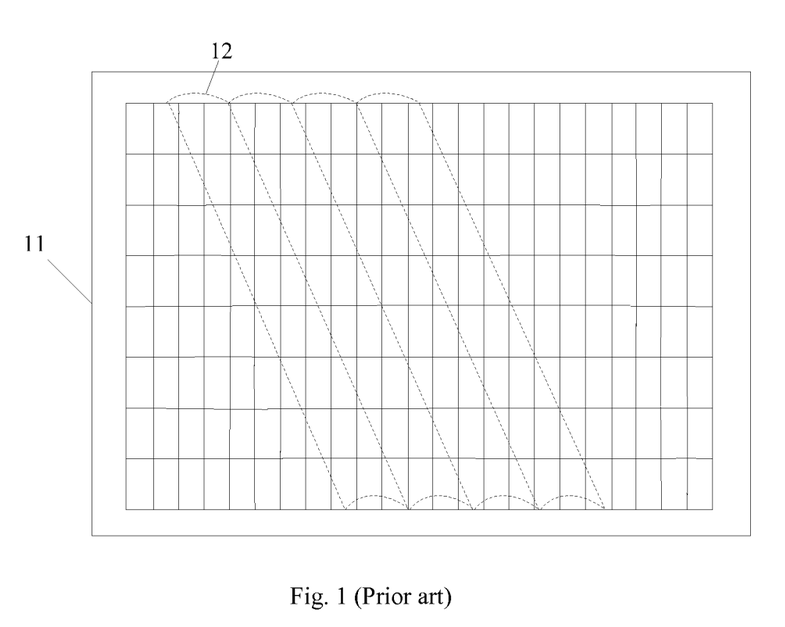
FIG. 1 is a schematic diagram showing a structure of a conventional auto-stereoscopic display.

A liquid crystal lens is used for forming a slant lenticular lens in the conventional technology so that both of 2D (two-dimensional) and 3D (three-dimensional) images can be displayed on a auto-stereoscopic display device. A plurality of slant lenticular lenses 12 are formed on a panel 11, as shown in FIG. 1. Images that the left eye needs are refracted to the left eye through the plurality of slant lenticular lenses 12, and images that the right eye needs are refracted to the right eye through the plurality of slant lenticular lenses 12. In this way, 3D images are shown. In the 3D display mode, the liquid crystal lens in the auto-stereoscopic display device works, while in the 2D display mode, the liquid crystal lens works as a flat mirror does. The light has to pass through the panel 11 and the liquid crystal lens before being emitted. It means that the light will be deteriorated to a degree, causing the brightness and luminance of the 2D display mode to be degraded.

SUMMARY OF THE INVENTION

An object of the present invention is to provide a auto-stereoscopic display device, a liquid crystal lens, and a driving method thereof. The invention can fulfill the 3D-mode requirement and provide outstanding brightness and luminance, so the effect of displaying images can be enhanced.

According to the present invention, an auto-stereoscopic display device comprises a display panel and a liquid crystal lens. The display panel comprises a plurality of pixel units which are arranged to be an array in a first direction and a second direction perpendicular to the first direction. The liquid crystal lens disposed on the plurality of pixel units comprises a first electrode layer, a second electrode layer, and a liquid crystal layer. The first electrode layer and the second electrode layer are disposed opposite to each other. The liquid crystal is sandwiched between the first electrode layer and the second electrode layer. The first electrode layer comprises a plurality of first electrode stripes extending in the first direction or the second direction and being arranged in parallel. The second electrode layer comprises a plurality of second electrode stripes slanting relative to the plurality of first electrode stripes and being arranged in parallel.

In one aspect of the present invention, the liquid crystal lens further comprises a voltage supplier. In the 3D display mode, first common voltage supplied by the voltage supplier is applied on the plurality of first electrode stripes, and first driving voltage supplied by the voltage supplier is applied on the plurality of second electrode stripes, so that a plurality of first lenticular lenses are formed along the plurality of second electrode stripes on the liquid crystal layer. In the 2D display mode, second driving voltage supplied by the voltage supplier is applied on the plurality of first electrode stripes, and second common voltage supplied by the voltage supplier is applied on the plurality of second electrode stripes, so that a plurality of second lenticular lenses are formed along the plurality of first electrode stripes on the liquid crystal layer.

In another aspect of the present invention, the first driving voltage applied on the one second electrode stripe is different from the first driving voltage applied on the adjacent second electrode stripe in the 3D display mode, and the second driving voltage applied on the one first electrode stripe is different from the second driving voltage applied on the adjacent first electrode stripe in the 2D display mode.

In another aspect of the present invention, the first direction is along a row direction of the display panel, and the second direction is along a column direction of the display panel.

In still another aspect of the present invention, the plurality of first electrode stripes extend in the row direction.

In yet another aspect of the present invention, the plurality of second electrode stripes slant relative to the second direction, and the slant angle is smaller than 45 degrees.

According to the present invention, a liquid crystal lens comprises a first electrode layer, a second electrode layer, and a liquid crystal layer. The first electrode layer and the second electrode layer are disposed opposite to each other. The liquid crystal layer is sandwiched between the first electrode layer and the second electrode layer. The first electrode layer comprises a plurality of first electrode stripes. The plurality of first electrode stripes extend in a predetermined direction and are arranged in parallel. The second electrode layer comprises a plurality of second electrode stripes. The plurality of second electrode stripes extend slantingly relative to the plurality of first electrode stripes and are arranged in parallel.

In one aspect of the present invention, the liquid crystal lens further comprises a voltage supplier. In the 3D display mode, first common voltage supplied by the voltage supplier is applied on the plurality of first electrode stripes, and first driving voltage supplied by the voltage supplier is applied on the plurality of second electrode stripes, so that a plurality of first lenticular lenses are formed along the plurality of second electrode stripes on the liquid crystal layer. In the 2D display mode, second driving voltage supplied by the voltage supplier is applied on the plurality of first electrode stripes, and second common voltage supplied by the voltage supplier is applied on the plurality of second electrode stripes, so that a plurality of second lenticular lenses are formed along the plurality of first electrode stripes on the liquid crystal layer.

In another aspect of the present invention, the first driving voltage applied on the one second electrode stripe is different from the first driving voltage applied on the adjacent second electrode stripe in the 3D display mode. The second driving voltage applied on the one first electrode stripe is different from the second driving voltage applied on the adjacent first electrode stripe in the 2D display mode.

According to the present invention, a method of driving a liquid crystal lens is provided. The liquid crystal lens comprises a first electrode layer, a second electrode layer, and a liquid crystal layer. The first electrode layer and the second electrode layer are disposed opposite to each other. The liquid crystal layer is sandwiched between the first electrode layer and the second electrode layer. The first electrode layer comprises a plurality of first electrode stripes. The plurality of first electrode stripes extend in a predetermined direction and are arranged in parallel. The second electrode layer comprises a plurality of second electrode stripes. The plurality of second electrode stripes extend slantingly relative to the plurality of first electrode stripes and are arranged in parallel. The method comprises steps of: in the 3D display mode, first common voltage applied on the plurality of first electrode stripes, and first driving voltage applied on the plurality of second electrode stripes, so that a plurality of first lenticular lens units are formed along the plurality of second electrode stripes on the liquid crystal layer; and in the 2D display mode, second driving voltage applied on the plurality of first electrode stripes, and second common voltage applied on the plurality of second electrode stripes, so that a plurality of second lenticular lens units are formed along the plurality of first electrode stripes on the liquid crystal layer.

The auto-stereoscopic display device comprises the liquid crystal lens which comprises a first electrode layer and a second electrode layer. The first and second electrode layers comprise a plurality of first electrode stripes and a plurality of second electrode stripes, respectively. The plurality of first electrode stripes and the plurality of second electrode stripes extend with one another slantingly. Using this structure, a plurality of first lenticular lens units are formed along the plurality of second electrode stripes in the 3D display mode, and a plurality of second lenticular lens units are formed along the plurality of first electrode stripes in the 2D display mode. The invention can fulfill the 3D-mode requirement and provide outstanding brightness and luminance, so the effect of displaying images can be enhanced, which is the merits of the present invention.

DETAILED DESCRIPTION OF THE PREFERRED EMBODIMENTS

The features and advantages of the preferred embodiments of the present invention will be more apparent from the following detailed description taken in conjunction with the accompanying drawings.

Figure 2:
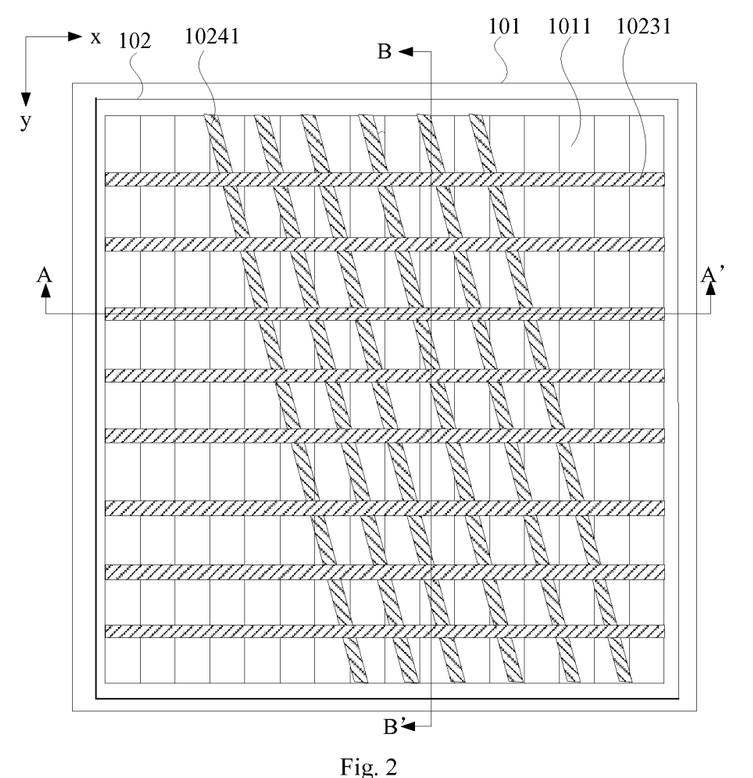
FIG. 2 is a top view of a auto-stereoscopic display apparatus according to an embodiment of the present invention.
Figure 3:
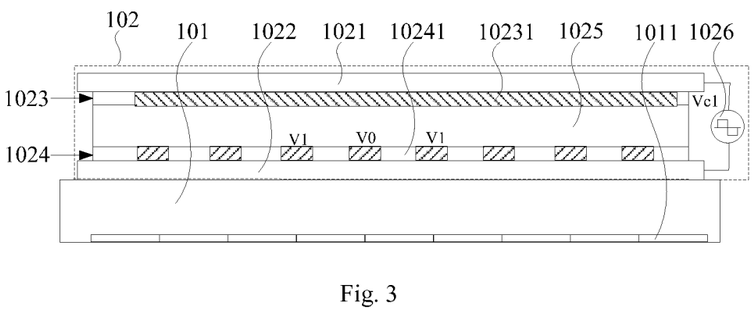
FIG. 3 is a cross-sectional schematic diagram showing the auto-stereoscopic display apparatus of FIG. 2 along line A-A'.

Please refer to FIG. 2 and FIG. 3. The auto-stereoscopic display device comprises a display panel 101 and a liquid crystal lens 102 according to one embodiment of the present invention. The display panel 101 comprises a plurality of pixel units 1011 which are arranged to be an array in a first direction "x" and a second direction "y". The first direction "x" is perpendicular to the second direction "y". The first direction "x" is along a row direction of the display panel 101. The second direction "y" is along a column direction of the display panel 101. The liquid crystal lens 102 is disposed on the display side of the display panel 101 and is located on the plurality of pixel units 1011. Light carrying image information is emitted through the liquid crystal lens 102. The liquid crystal lens 102 comprises a first substrate 1021, a second substrate 1022, a first electrode layer 1023, and a second electrode layer 1024. The first substrate 1021 and the second substrate 1022 are disposed opposite to each other. The first electrode layer 1023 and the second electrode layer 1024 are disposed opposite to each other. The first electrode layer 1023 is disposed on the first substrate 1021 and faces the second substrate 1022. The second electrode layer 1024 is disposed on the second substrate 1022 and faces the first substrate 1021. The liquid crystal lens 102 also comprises a liquid crystal layer 1025 sandwiched between the first electrode layer 1023 and the second electrode layer 1024.

The first electrode layer 1023 comprises a plurality of first electrode stripes 10231. The plurality of first electrode stripes 10231 extend in the first direction "x" and are arranged in parallel in the second direction "y". The second electrode layer 1024 comprises a plurality of second electrode stripes 10241. The plurality of second electrode stripes 10241 extend slantingly relative to the plurality of first electrode stripes 10231 and are arranged in parallel in the first direction "x". As shown in FIG. 2, the plurality of first electrode stripes 10231 extend in a first direction "x" and are located on the parting of the plurality of pixel units 1011 in rows. One pixel unit 1011 is separated from another by two adjacent first electrode stripes 10231 in the second direction "y". The plurality of second electrode stripes 10241 (only some of the plurality of second electrode stripes 10241 are shown in FIG. 2) slant relative to the second direction "y". The slant angle is preferably smaller than 45 degrees. The slant angle of the plurality of second electrode stripes 10241 is 30 degrees relative to the second direction "y" in this embodiment. The slant angle can be an arbitrary number, such as 25, 28, and 35, in other embodiments. The slant angle is not limited; instead, the slant angle is adjusted depending on the practical situation on display.

A user of the liquid crystal lens 102 can view 3D images easily without wearing glasses. Moreover, the brightness and luminance is enhanced in the 2D mode.

Figure 4:
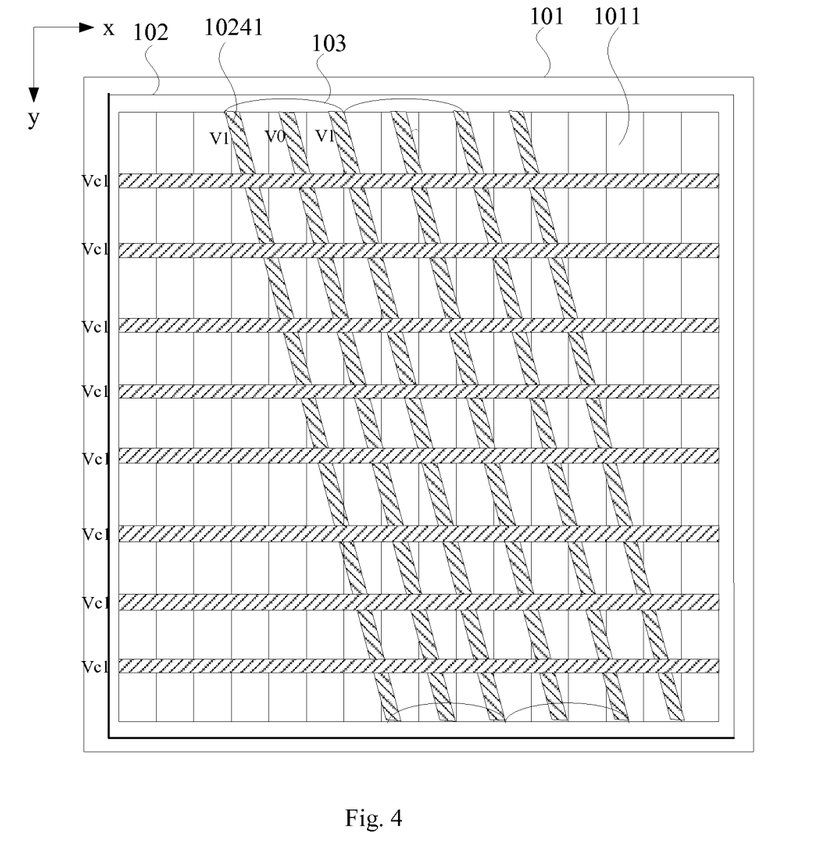
FIG. 4 is a schematic diagram showing a plurality of first lenticular lens units formed in the auto-stereoscopic display apparatus of FIG. 2 in 3D mode.
Figure 5:
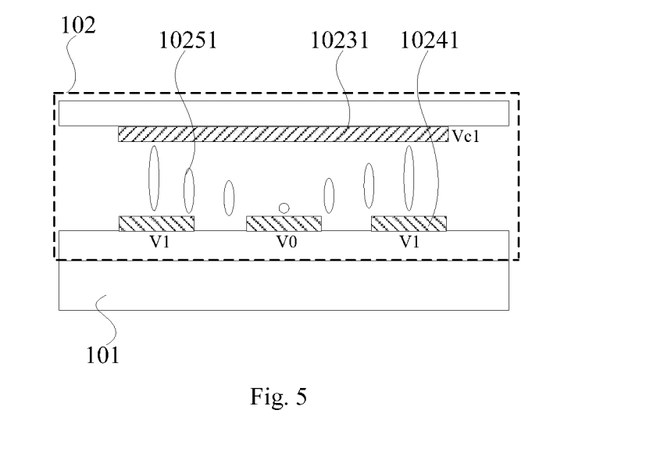
FIG. 5 shows forming of the first lenticular lens units of FIG. 4.
Figure 6:
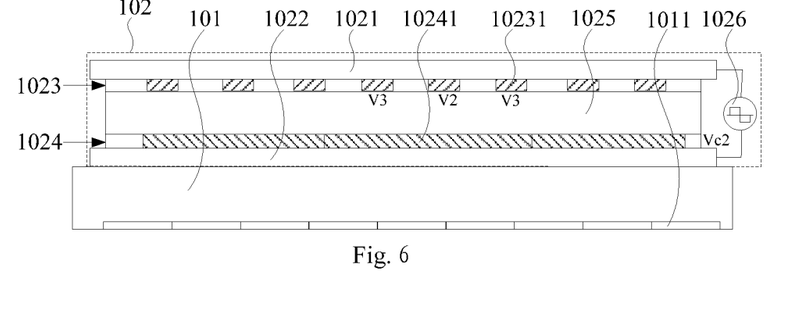
FIG. 6 is a cross-sectional schematic diagram showing the auto-stereoscopic display apparatus of FIG. 2 along line B-B'.

Specifically, the liquid crystal lens 102 further comprises a voltage supplier 1026. In the 3D display mode, first common voltage Vc1 supplied by the voltage supplier 1026 is applied on the plurality of first electrode stripes 10231, and first driving voltage supplied by the voltage supplier 1026 is applied on the plurality of second electrode stripes 10241. The first common voltage Vc1 and the first driving voltage are necessary to display 3D images. Preferably, the first driving voltage applied on one second electrode stripe 10241 is different from the first driving voltage applied on its adjacent second electrode stripe 10241. In this way, the voltage drop between the one second electrode stripe 10241 and the first electrode stripe 10231 is different from that between its adjacent second electrode stripe 10241 and the first electrode stripe 10231. Please refer to FIG. 4. The first common voltage Vc1 and the first driving voltage are applied on the liquid crystal layer 1025, and then a plurality of first lenticular lenses 103 are formed on the liquid crystal layer 1025 and are disposed along the plurality of second electrode stripes 10241. For example, three second electrode stripes 10241 are arranged, as shown in FIG. 5. Voltage V0 of the first driving voltage applied on the middle second electrode stripe 10241 is smaller than voltage V1 of the first driving voltage applied on the rightmost and leftmost second electrode stripes 10241. So a difference in voltage between the first electrode stripe 10231 and the middle second electrode stripe 10241 is less than a difference in voltage between the first electrode stripe 10231 and the rightmost and leftmost second electrode stripes 10241. The voltage drop generates an electric field. The feature of the electric field is center-symmetric. The center of the electric field is the middle second electrode stripe 10241. The periphery of the electric field is the rightmost and leftmost second electrode stripes 10241. Liquid crystal molecules 10251 in the liquid crystal layer 1025 are arranged under the influence of the electric field. Then, the plurality of first lenticular lenses 103 are formed in the liquid crystal layer 1025, as shown in FIG. 4. Relative to the first electrode stripe 10231, the slant angle and extension direction of the first lenticular lens 103 is identical to that of the second electrode stripe 10241.

The realization of 3D images on the display panel 101 is described as follows. Images corresponding to each of the plurality of first lenticular lenses 103 pass the plurality of first lenticular lenses 103. A image signal that the left eye needs is refracted by the first lenticular lens 103 to a direction towards the left eye, and a image signal that the right eye needs is refracted by the first lenticular lens 103 to a direction towards the right eye. In this way, 3D images are shown. A viewer still views 3D images even though he/she does not wear any glasses. In addition, the plurality of first lenticular lenses 103 are disposed slantingly, so the brightness and luminance is equally distributed.

Figure 7:
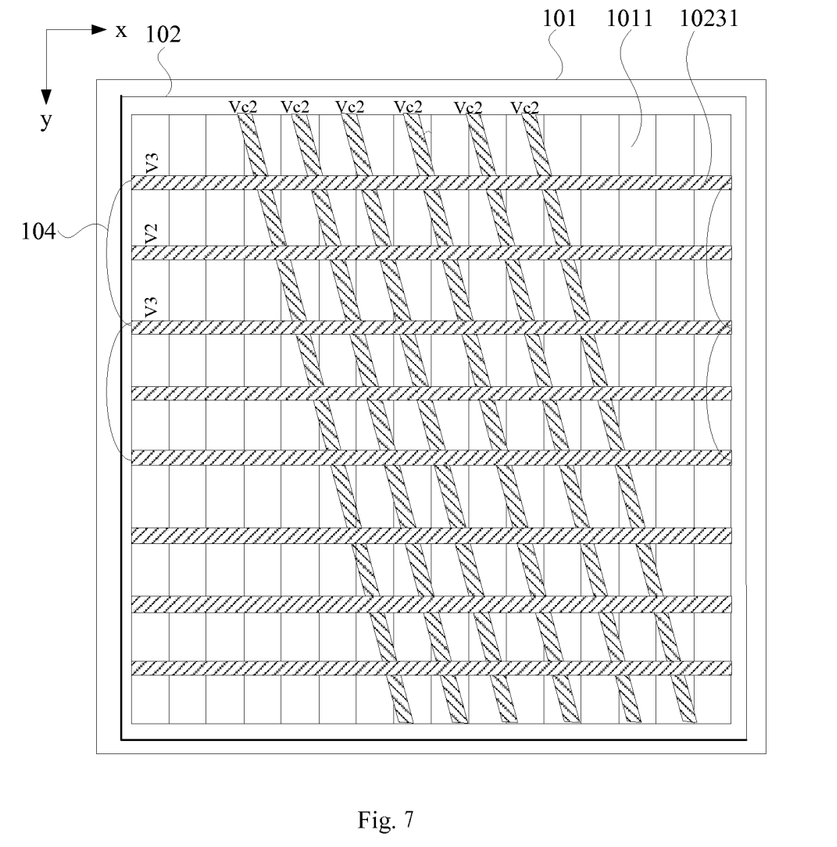
FIG. 7 is a schematic diagram showing a plurality of second lenticular lens units formed in the auto-stereoscopic display apparatus of FIG. 2 in 2D mode.
Figure 8:
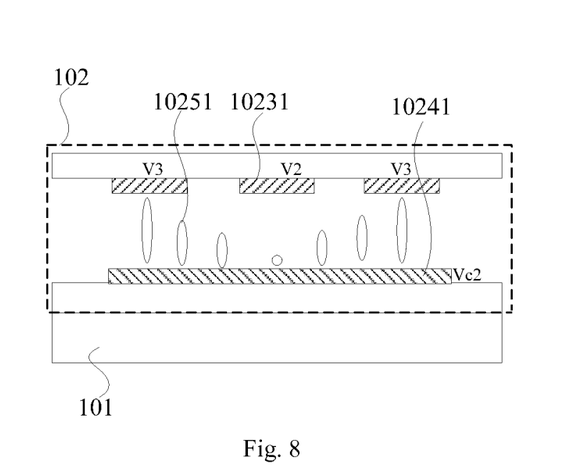
FIG. 8 shows forming of the second lenticular lens units of FIG. 7.

Please refer to FIG. 2 and FIGS. 6-8. In the 2D display mode, second driving voltage supplied by the voltage supplier 1026 is applied on the plurality of first electrode stripes 10231, and second common voltage Vc2 supplied by the voltage supplier 1026 is applied on the plurality of second electrode stripes 10241. The second driving voltage and the second common voltage Vc2 are necessary to display 2D images. Preferably, the second driving voltage applied on one first electrode stripe 10231 is different from the second driving voltage applied on its adjacent first electrode stripe 10231. In this way, the voltage drop between the one first electrode stripe 10231 and the second electrode stripe 10241 is different from that between its adjacent first electrode stripe 10231 and the second electrode stripe 10241. Afterwards, a plurality of second lenticular lenses 104 are formed on the liquid crystal layer 1025 and are disposed along the plurality of first electrode stripes 10231, as shown in FIG. 7. For example, three first electrode stripes 10231 are arranged. Voltage V2 of the second driving voltage applied on the middle first electrode stripe 10231 is smaller than voltage V3 of the second driving voltage applied on the rightmost and leftmost first electrode stripes 10231. So a difference in voltage between the second electrode stripe 10241 and the middle first electrode stripe 10231 is less than a difference in voltage between the second electrode stripe 10241 and the rightmost and leftmost first electrode stripes 10231. The voltage drop generates an electric field. The feature of the electric field is center-symmetric. The center of the electric field is the middle first electrode stripe 10231. The periphery of the electric field is the rightmost and leftmost first electrode stripes 10231. The liquid crystal molecules 10251 in the liquid crystal layer 1025 are arranged under the influence of the electric field, as shown in FIG. 8. The plurality of second lenticular lenses 104 are formed in the liquid crystal layer 1025, as shown in FIG. 7. The plurality of second lenticular lenses 104 and the first direction "x" are in parallel.

The realization of 2D images on the display panel 101 is described as follows. 2D images corresponding to each of the plurality of second lenticular lenses 104 pass the plurality of second lenticular lenses 104. The 2D images which are transmitted in parallel are refracted by the plurality of second lenticular lenses 104 to the same viewing angle. Viewers can view clearer 2D images at the same viewing angle with enhanced brightness and luminance.

It is worth noting that the plurality of first electrode stripes 10231 can be disposed on locations corresponding to the plurality of pixel units 1011 rather than being limited to the parting of the plurality of pixel units 1011 in rows. The plurality of pixel units 1011 can be disposed between two adjacent first electrode stripes 10231 in the second direction "y". Concrete limitations will not be described.

To sum up, the auto-stereoscopic display device provided by the present invention can fulfill the 3D-mode requirement and provide outstanding brightness and luminance in the 2D display mode by means of applying voltage on the plurality of first electrode stripes 10231 and the plurality of second electrode stripes 10241 correspondingly.

Figure 9:
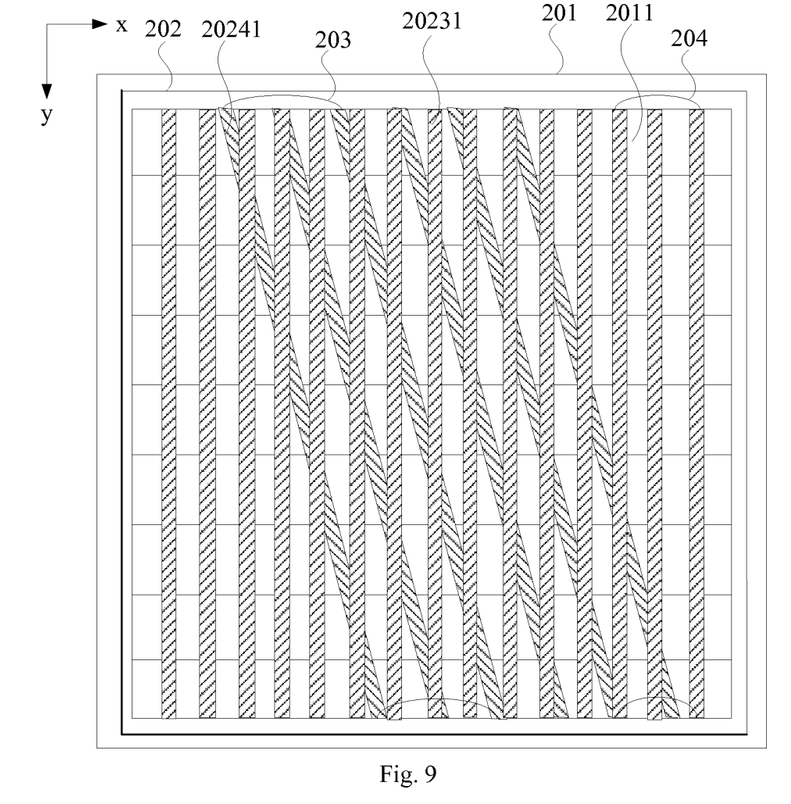
FIG. 9 is a top view of a auto-stereoscopic display apparatus according to an another embodiment of the present invention.

Please refer to FIG. 9. In another embodiment of the present invention, a plurality of first electrode stripes 20231 of a liquid crystal lens 202 extend in a second direction "y" and are arranged in parallel in a first direction "x". Each of the plurality of first electrode stripes 20231 is disposed on the parting of pixel units 2011 in columns. A pixel unit 2011 is disposed between two adjacent first electrode stripes 20231 in the first direction "x". Of course, the plurality of first electrode stripes 20231 can be disposed on other locations. And, a plurality of pixel units 2011 can be disposed between two adjacent first electrode stripes 20231 in the first direction "x". What is described in this paragraph is what this embodiment is different from the above-mentioned embodiment.

In the 3D and 2D display modes, voltage is correspondingly applied on the plurality of first electrode stripes 20231 and the plurality of second electrode stripes 20241. Correspondingly, a plurality of first lenticular lens units 203 are formed in the 3D display mode, and a plurality of second lenticular lens units 204 are formed in the 2D display mode. As a result, not only the 3D-mode requirement is fulfilled, but also the brightness and luminance needed in the 2D display mode is enhanced. The concrete driving process can be carried out according to the embodiment, so the repetitious details will not be given here.

In addition, another embodiment is proposed by the present invention. The auto-stereoscopic display device comprises a first electrode layer, a second electrode layer, and a liquid crystal layer. The first electrode layer and the second electrode layer are disposed opposite to each other. The liquid crystal layer is sandwiched between the first electrode layer and the second electrode layer. The first electrode layer comprises a plurality of first electrode stripes. The plurality of first electrode stripes extend in a predetermined direction and are arranged in parallel. The second electrode layer comprises a plurality of second electrode stripes. The plurality of second electrode stripes extend slantingly relative to the plurality of first electrode stripes and are arranged in parallel.

Furthermore, a driving method for a liquid crystal lens is provided according to one embodiment of the present invention. The embodiment adopts the liquid crystal lens 102 proposed in the above-mentioned embodiments. Please refer to FIG. 2 illustrating the liquid crystal lens 102. The driving method comprises the following steps.

In the 3D display mode, first common voltage is applied on a plurality of first electrode stripes 10231, and first driving voltage is applied on a plurality of second electrode stripes 10241. As a result, a plurality of first lenticular lens units are formed on a liquid crystal layer 1025 and are disposed along the plurality of second electrode stripes 10241. As a result, the effect of displaying 3D images is realized.

In the 2D display mode, second driving voltage is applied on the plurality of first electrode stripes 10231, and second common voltage is applied on the plurality of second electrode stripes 10241. As a result, a plurality of second lenticular lens units are formed on the liquid crystal layer 1025 and are disposed along the plurality of first electrode stripes 10231. As a result, the brightness and luminance of 2D images is enhanced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An auto-stereoscopic display device, comprising:
   a display panel, comprising a plurality of pixel units which are arranged to be an array in a first direction and a second direction which is perpendicular to the first direction;
   a liquid crystal lens, disposed on the plurality of pixel units, comprising a first electrode layer, a second electrode layer, and a liquid crystal layer, the first electrode layer and the second electrode layer disposed opposite to each other, the liquid crystal sandwiched between the first electrode layer and the second electrode layer, the first electrode layer comprising a plurality of first electrode stripes extending in the first direction or the second direction and being arranged in parallel, and the second electrode layer comprising a plurality of second electrode stripes slanting relative to the plurality of first electrode stripes and being arranged in parallel.

2. The device as claimed in claim 1, wherein the liquid crystal lens further comprises a voltage supplier, in the 3D display mode, first common voltage supplied by the voltage supplier is applied on the plurality of first electrode stripes, and first driving voltage supplied by the voltage supplier is applied on the plurality of second electrode stripes, so that a plurality of first lenticular lenses are formed along the plurality of second electrode stripes on the liquid crystal layer, and in the 2D display mode, second driving voltage supplied by the voltage supplier is applied on the plurality of first electrode stripes, and second common voltage supplied by the voltage supplier is applied on the plurality of second electrode stripes, so that a plurality of second lenticular lenses are formed along the plurality of first electrode stripes on the liquid crystal layer.

3. The device as claimed in claim 2, wherein the first driving voltage applied on the one second electrode stripe is different from the first driving voltage applied on the adjacent second electrode stripe in the 3D display mode, and the second driving voltage applied on the one first electrode stripe is different from the second driving voltage applied on the adjacent first electrode stripe in the 2D display mode.

4. The device as claimed in claim 1, wherein the first direction is a row direction of the display panel, and the second direction is a column direction of the display panel.

5. The device as claimed in claim 1, wherein the plurality of first electrode stripes extend in the row direction.

6. The device as claimed in claim 1, wherein the plurality of second electrode stripes slant relative to the second direction, and the slant angle is smaller than 45 degrees.

7. A liquid crystal lens, comprising a first electrode layer, a second electrode layer, and a liquid crystal layer, the first electrode layer and the second electrode layer disposed opposite to each other, the liquid crystal layer sandwiched between the first electrode layer and the second electrode layer, the first electrode layer comprising a plurality of first electrode stripes, the plurality of first electrode stripes extending in a predetermined direction and being arranged in parallel, the second electrode layer comprising a plurality of second electrode stripes, and the plurality of second electrode stripes extending slantingly relative to the plurality of first electrode stripes and being arranged in parallel.

8. The liquid crystal lens as claimed in claim 7, wherein the liquid crystal lens further comprises a voltage supplier, in the 3D display mode, first common voltage supplied by the voltage supplier is applied on the plurality of first electrode stripes, and first driving voltage supplied by the voltage supplier is applied on the plurality of second electrode stripes, so that a plurality of first lenticular lenses are formed along the plurality of second electrode stripes on the liquid crystal layer, and in the 2D display mode, second driving voltage supplied by the voltage supplier is applied on the plurality of first electrode stripes, and second common voltage supplied by the voltage supplier is applied on the plurality of second electrode stripes, so that a plurality of second lenticular lenses are formed along the plurality of first electrode stripes on the liquid crystal layer.

9. The liquid crystal lens as claimed in claim 8, wherein the first driving voltage applied on the one second electrode stripe is different from the first driving voltage applied on the adjacent second electrode stripe in the 3D display mode, and the second driving voltage applied on the one first electrode stripe is different from the second driving voltage applied on the adjacent first electrode stripe in the 2D display mode.

10. A method of driving a liquid crystal lens, the liquid crystal lens comprising a first electrode layer, a second electrode layer, and a liquid crystal layer, the first electrode layer and the second electrode layer disposed opposite to each other, the liquid crystal layer sandwiched between the first electrode layer and the second electrode layer, the first electrode layer comprising a plurality of first electrode stripes, the plurality of first electrode stripes extending in a predetermined direction and being arranged in parallel, the second electrode layer comprising a plurality of second electrode stripes, and the plurality of second electrode stripes extending slantingly relative to the plurality of first electrode stripes and being arranged in parallel, wherein the method comprises steps of:
   in the 3D display mode, first common voltage applied on the plurality of first electrode stripes, and first driving voltage applied on the plurality of second electrode stripes, so that a plurality of first lenticular lens units are formed along the plurality of second electrode stripes on the liquid crystal layer; and
   in the 2D display mode, second driving voltage applied on the plurality of first electrode stripes, and second common voltage applied on the plurality of second electrode stripes, so that a plurality of second lenticular lens units are formed along the plurality of first electrode stripes on the liquid crystal layer.

* * * * *